United States Patent
Abe et al.

(10) Patent No.: US 7,190,846 B2
(45) Date of Patent: Mar. 13, 2007

(54) IMAGE READER

(75) Inventors: Tsutomu Abe, Ashigarakami-gun (JP); Tetsuo Iyoda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/245,028

(22) Filed: Oct. 7, 2005

(65) Prior Publication Data

US 2006/0088226 A1    Apr. 27, 2006

Related U.S. Application Data

(62) Division of application No. 09/717,155, filed on Nov. 22, 2000, now Pat. No. 7,016,551.

(30) Foreign Application Priority Data

Apr. 10, 2000  (JP)  ............................. 2000-108298
Apr. 10, 2000  (JP)  ............................. 2000-108299

(51) Int. Cl.
*G06K 9/36*        (2006.01)

(52) U.S. Cl. ...................... 382/284; 382/294; 382/299; 358/1.2; 358/540; 358/450

(58) Field of Classification Search ................ 382/282, 382/284, 294, 299; 358/540, 450, 453, 1.2
See application file for complete search history.

(56) References Cited

U.S. PATENT DOCUMENTS 5,033,725 A * 7/1991 van Duursen ............ 270/52.02
5,146,275 A    9/1992 Tone et al.
5,187,754 A * 2/1993 Currin et al. ............... 382/284
5,287,272 A * 2/1994 Rutenberg et al. .......... 382/224
5,456,256 A * 10/1995 Schneider et al. .......... 600/445
5,539,524 A    7/1996 Hasebe et al.
5,757,424 A * 5/1998 Frederick ................. 348/218.1
5,764,379 A * 6/1998 Matsuda et al. ............ 358/474
5,764,383 A    6/1998 Saund et al.
5,796,861 A * 8/1998 Vogt et al. ................. 382/128
5,831,750 A   11/1998 Okisu et al.
5,847,884 A * 12/1998 Kamon et al. .............. 359/806
5,995,245 A   11/1999 Moro
6,177,979 B1 * 1/2001 Oliva ......................... 355/53
6,269,175 B1 * 7/2001 Hanna et al. ............... 382/107
6,552,412 B2 * 4/2003 Kano ......................... 257/595

FOREIGN PATENT DOCUMENTS

JP       11-136564        5/1999
JP       2000-105818      4/2000

* cited by examiner

*Primary Examiner*—Matthew C. Bella
*Assistant Examiner*—Yosef Kassa
(74) *Attorney, Agent, or Firm*—Oliff & Berridge, PLC

(57) ABSTRACT

A CCD camera 10 picks up multiple adjacent targeted portions on a document 2, and to obtain distance information, a distance measurement unit 11 calculates the distances to the targeted portions of the document 2. Based on the distance information, a synthesization controller 16 prepares perspective information for the images, adjusts the sizes of the multiple obtained plane images so they correspond, and synthesizes the resultant plane images to form a single image.

6 Claims, 17 Drawing Sheets

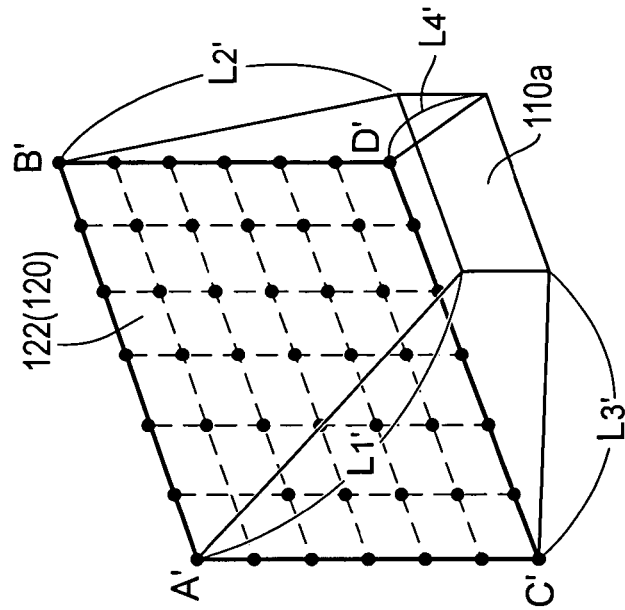
FIG. 8
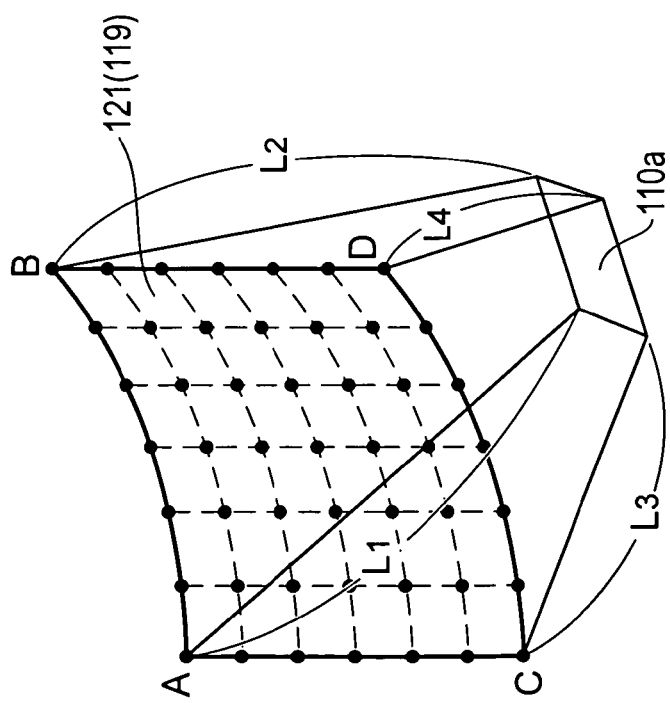

IMAGE READER

This is a Division of application Ser. No. 09/717,155 filed Nov. 22, 2000 now U.S. Pat. No. 7,016,551. The entire disclosure of the prior application is hereby incorporated by reference herein in its entirety.

BACKGROUND

The present invention relates to an image reader that is appropriate for a TV telephone or a TV conference system, and relates in particular to an image reader that can be compactly and lightly constructed, and that can accurately and quickly read the image of even a distorted object.

An example, conventional image reader is disclosed in JP-A-11-136564.

This image reader comprises: an image pickup unit, for obtaining, using an image forming optical system having a variable magnification rate, an image of an object document at a predetermined magnification rate; a distance sensor, for measuring distances to three targeted points on the object document; and an image synthesizer, for employing, when the image pickup unit sequentially acquires the images of adjacent targeted portions at the same magnification rate, the distance values obtained by the distance sensor to transform multiple, thus obtained images into those equivalent to images viewed from the front, and for synthesizing the transformed images to prepare a single image of the entire document. According to this image reader, the document can be read very accurately, even when the document is positioned so that it is tilted. Further, since glass platen that is equal to or larger than a document is not required, the size of the image reader can be reduced.

However, since a premise of the employment of a conventional image reader is that a document have a flat face, such an image reader can not satisfactorily read a document that is bent, and distorted document information is obtained. When, for example, a page of an opened book is to be read, the images, such as character images, at the bound portion, where the page is bent, can not be read accurately.

When a document that is tilted is to be read, the distance to the image pickup unit varies, depending on the portion of the document that is to be read. Thus, the sizes of the individual images differ, and the synthesized image is distorted. In this case, the magnification rate can be changed by referring to the characteristics of adjacent images for the performance of the synthesization process. However, according to this method, the magnification rate must be changed repeatedly, and an extended time is required for the synthesization process.

SUMMARY OF THE INVENTION

It is, therefore, one objective of the present invention to provide an image reader that can accurately and quickly read an object, even one that is distorted.

It is another objective of the present invention to provide an image reader that can be compactly and lightly constructed.

To achieve the above objectives, according to the present invention, an image reader comprises:

image pickup means, for obtaining multiple targeted adjacent portions at the same optical magnification rate, and for obtaining multiple images;

measurement means, for measuring multiple distances to multiple respective points that are selected on the targeted portions; and processing means, for employing the multiple distances to perform perspective transformations of the multiple images to acquire multiple plane images, and for altering the sizes of the multiple plane images so that all sizes correspond.

With this configuration, the perspective transformation is performed for the images obtained for the plane images, so that even a distorted object can be accurately read. Further, since a plurality of plane images are altered to provide corresponding sizes, the image synthesization process can be performed quickly.

Further, to achieve the above objectives, an image reader comprises:

image pickup means, for acquiring an image of an object;

measurement means, for measuring multiple distances to multiple respective points that are selected on the object; and processing means, for employing the multiple distances to perform perspective transformations for the image to obtain a plane image.

With this arrangement, multiple images can be acquired using a hand-held image reader, distances to multiple target portions can be measured, and a small and light apparatus can be manufactured.

BRIEF DESCRIPTION OF THE DRAWINGS

FIG. 8 is a diagram showing perspective transformation and magnification rate calculations performed by the synthesization controller in the image reader according to the fourth embodiment.

DETAILED DESCRIPTION OF THE PRESENT INVENTION

First Embodiment

Figure 1A:
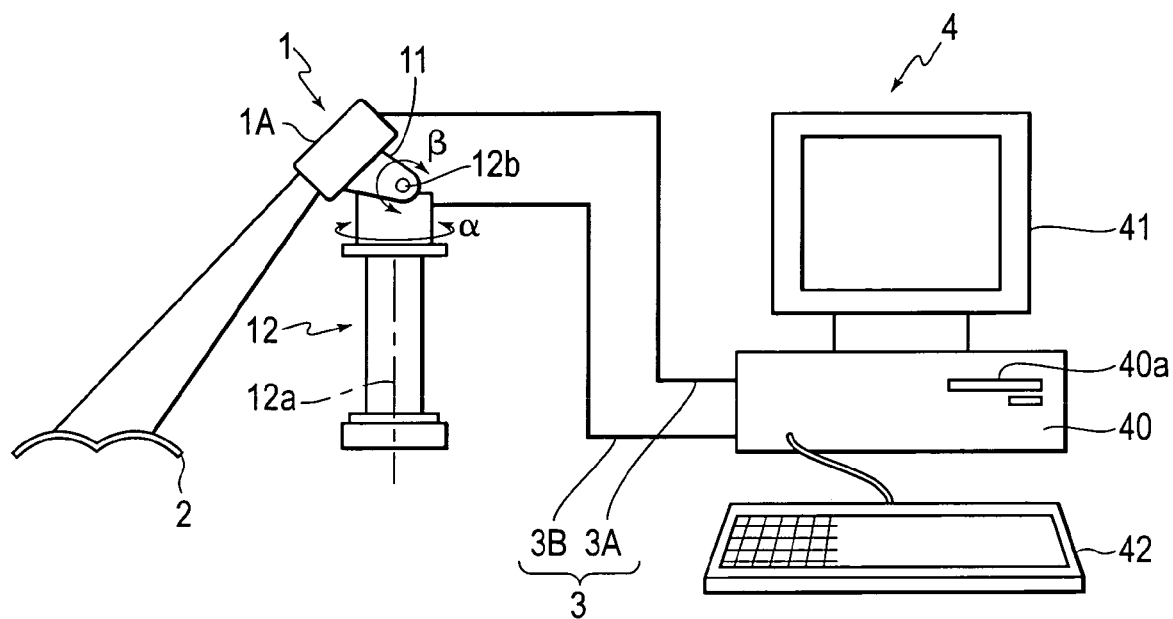
FIG. 1A is a diagram showing an image reading system to which an image reader according to a first embodiment of the present invention is applied.

FIG. 1A is a diagram showing an image reading system that employs an image reader according to a first embodiment of the present invention. The image reading system comprises: an image reader 1, for reading a document 2, an object; and a computer 4, which is connected to the image reader 1 by an interface 3, such as an image signal line 3A and an RS232C cable 3B. The image reader 1 includes a main body 1A in which a digital CCD camera, which will be described later, is mounted, and a scanning unit 12, for pivoting the main body 1A along an axis 12a and at a shaft 12b in a direction α or β, as is indicated by an arrow.

The computer 4 includes a computer main body 40 in which a CPU and a memory are mounted; a display unit 41, such as a CRT; and an input unit 42, such as a keyboard or a mouse. The computer 4 processes an image that is read, or controls the zooming and the focusing of the digital CCD camera and the positioning that is required to read an image. The computer main body 40 also includes a drive 40a for reading data from a memory card, such as a floppy disk, that has been loaded.

Figure 1B:
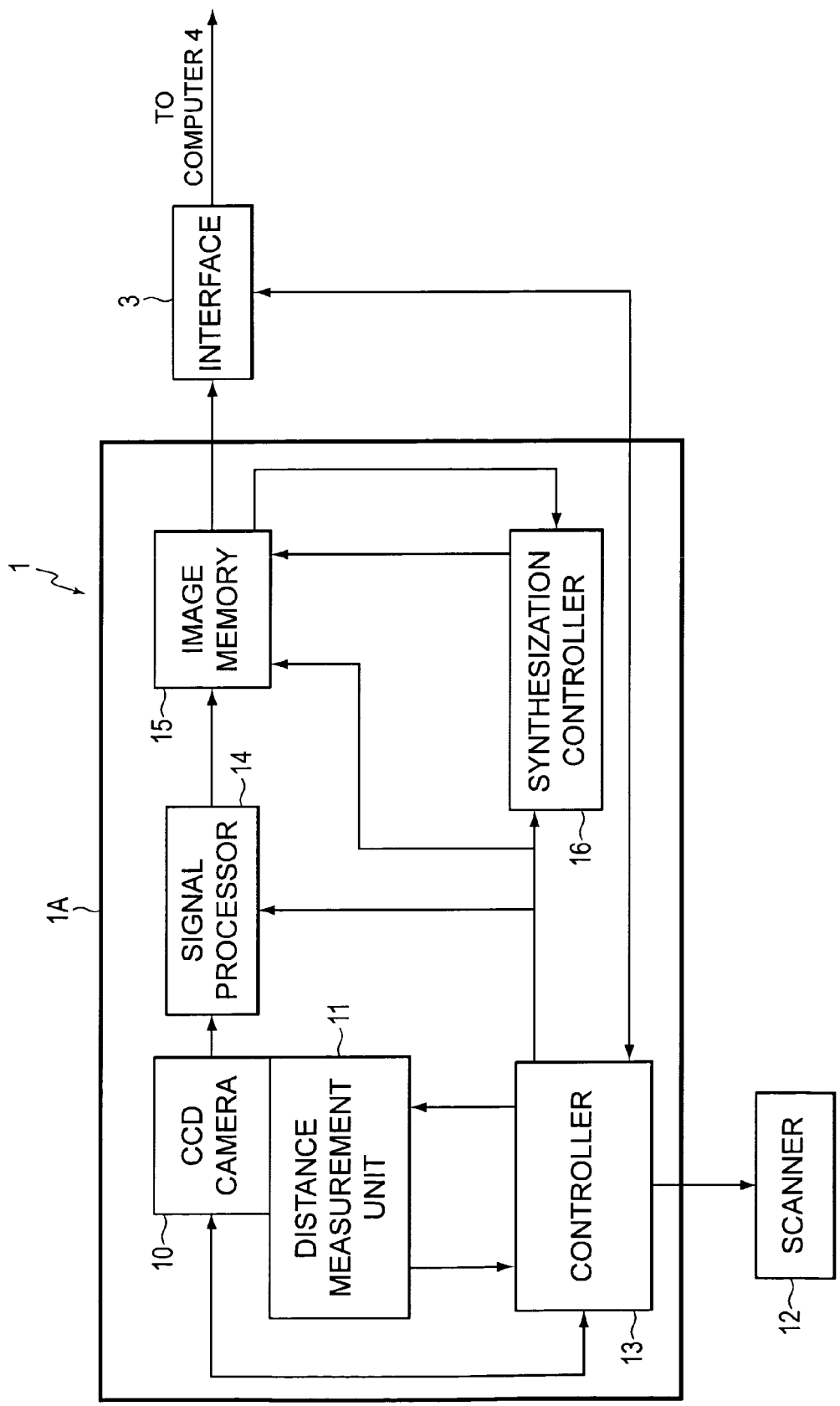
FIG. 1B is a block diagram illustrating the control system of the image reader according to the first embodiment.

FIG. 1B is a diagram showing the control system of the image reader 1. The main body 1A of the image reader 1 comprises: a digital CCD camera, having a zooming function and a focusing function; a distance measurement unit 11, for obtaining two-dimensional distance information (distances to n×m measurement points) for the targeted portions of a document 2 that is acquired by the CCD camera 10; a scanner 13, for changing the viewing directions of the CCD camera 10 and the distance measurement unit 11; a controller 13, for controlling the CCD camera 10, the distance measurement unit 11 and the scanner 12; a signal processor 14, for performing signal processing, such as amplification or correction, for a pickup signal received from the CCD camera 10; an image memory 15, for storing images; and a synthesis controller 16 for synthesizing multiple images stored in the image memory 15.

The distance measurement unit 11 employs the pattern projection method or the phase distribution measurement method to obtain two-dimensional information for the distance to the document 2. According to an example pattern projection method, whereby a laser beam is employed to generate, based on pattern code, a light pattern that consists of multiple regions the intensity of which is modulated to obtain triple level or higher data, the light pattern produces an image of the document 2 and the light reflected from the document 2 is acquired to prepare an image pattern, whereafter, the pattern code and the pattern image are employed to obtain information for measuring the distance to the document 2. Using this method, since the laser beam used as a light source has a linearity that little affects the depth of focus, the edges between the regions are not blurred, and for the depth, the measurable range is expanded. Further, since an image of the document 2 is projected by the pattern light at the modulated intensity, two-dimensional information for measuring the distance to the document 2 can be obtained using a single image pickup. In addition, there is an example phase distribution measurement method whereby light, whose intensity is modulated at a predetermined frequency, is emitted and strikes the document 2, and whereby a composite light, consisting of light reflected by the document 2 and the above emitted light, is received by a plane sensor that is constituted by multiple, two-dimensionally arranged pixels, and information for the distance to the document 2 is obtained based on the detection signal. According to this method, the two-dimensional information for the distance to the document 2 can be obtained by a single one measurement.

The synthesization controller 16 performs perspective transformation, calculation of a magnification rate, the alteration of image size and image synthesization based on an image signal fetched into the image memory 15 and the information obtained by the distance measurement unit 11 for the distance between the document and the CCD camera 10.

Figure 2:
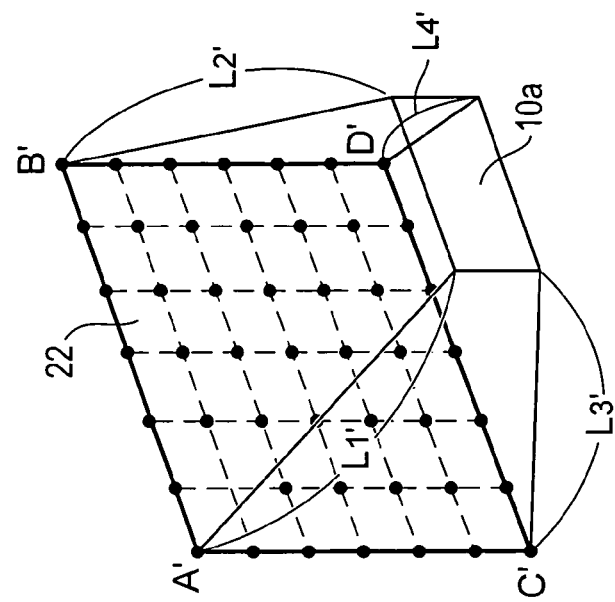
FIG. 2 is a diagram showing perspective transformation and magnification rate calculations performed by the synthesization controller in the image reader according to the first embodiment.
Figure 2:
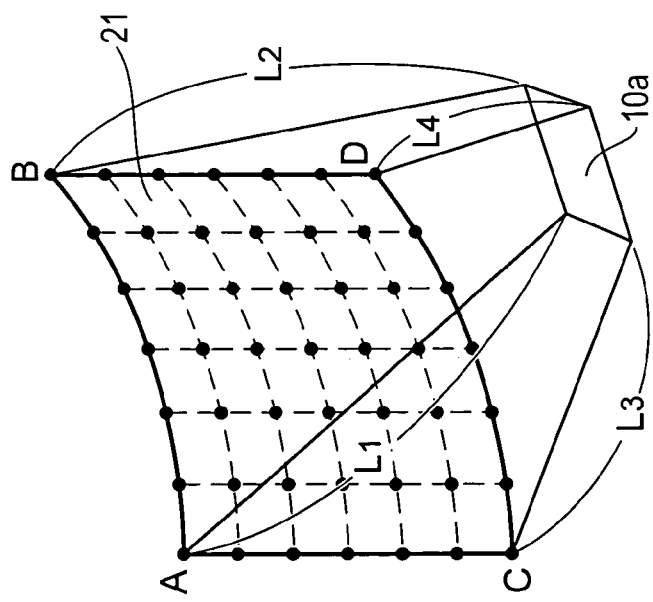

FIG. 2 is a diagram for the perspective transformation and calculation of a magnification rate that are performed by the synthesization controller 16. In FIG. 2, black dots represent the points used for the measurement of distances. The synthesization controller 16 employs the distance information ($L_1$, $L_2$, $L_3$ and $L_4$) to estimate similar curves, and to identify the shape of an object. Then, the synthesization controller 16 performs a perspective transformation so that an image 21 stands, upright relative to a pickup device 10a of the CCD camera 10, and constitutes a plane. In FIG. 2, the distances $L_1$, $L_2$, $L_3$ and $L_4$ from the pickup device 10 to the individual points of the image 21 are transformed into distances $L'_1$, $L'_2$, $L'_3$ and $L'_4$, and the image obtained by the perspective transformation is called a "plane image" 22. Furthermore, the synthesization controller 16 calculates multiple distances on the plane image 22, e.g., distances between points A' and B' and between points A' and C', and performs a "magnification rate calculation" to obtain a magnification rate relative to a predetermined reference size.

Figure 3:
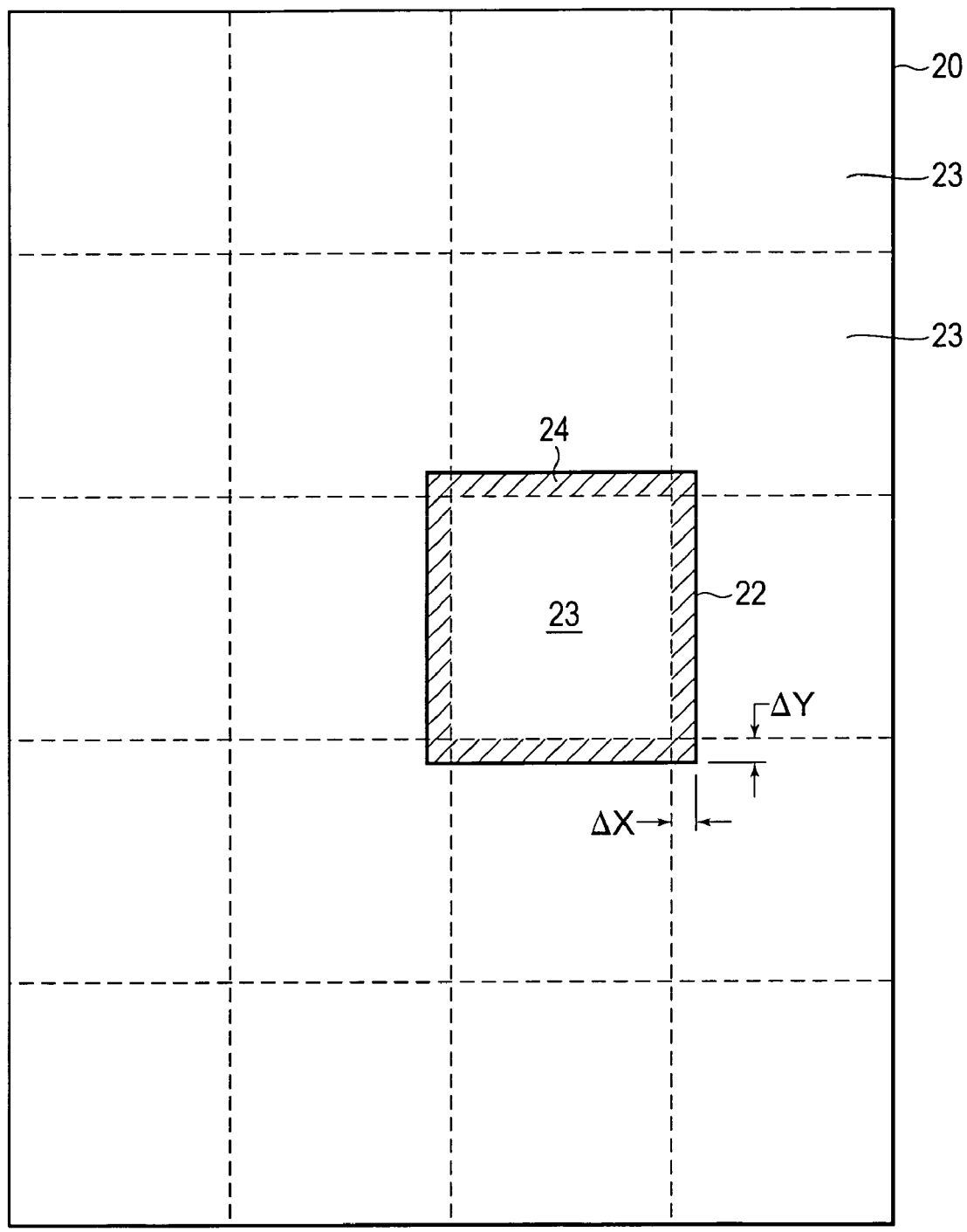
FIG. 3 is a diagram showing the synthesization processing performed by the synthesization controller of the image reader according to the first embodiment.

FIG. 3 is a diagram showing an image synthesization process performed by the synthesization controller 16. Assuming that multiple images are obtained so that adjacent images 23 include overlapping size Δx and Δy areas 24, the synthesization controller 16 aligns the sizes of the plane images 22. Then, the synthesization controller 16 determines the locations whereat the density patterns of the overlapping areas 24 of the plane images 22 to be synthesized are the most similar to the density patterns of the adjacent images 23 that are already stored in the image memory 15. The images 23, excluding the overlapping areas 24, are then fitted into the locations. Through this "synthesization process", one complete image 20 is finally completed.

Figure 4:
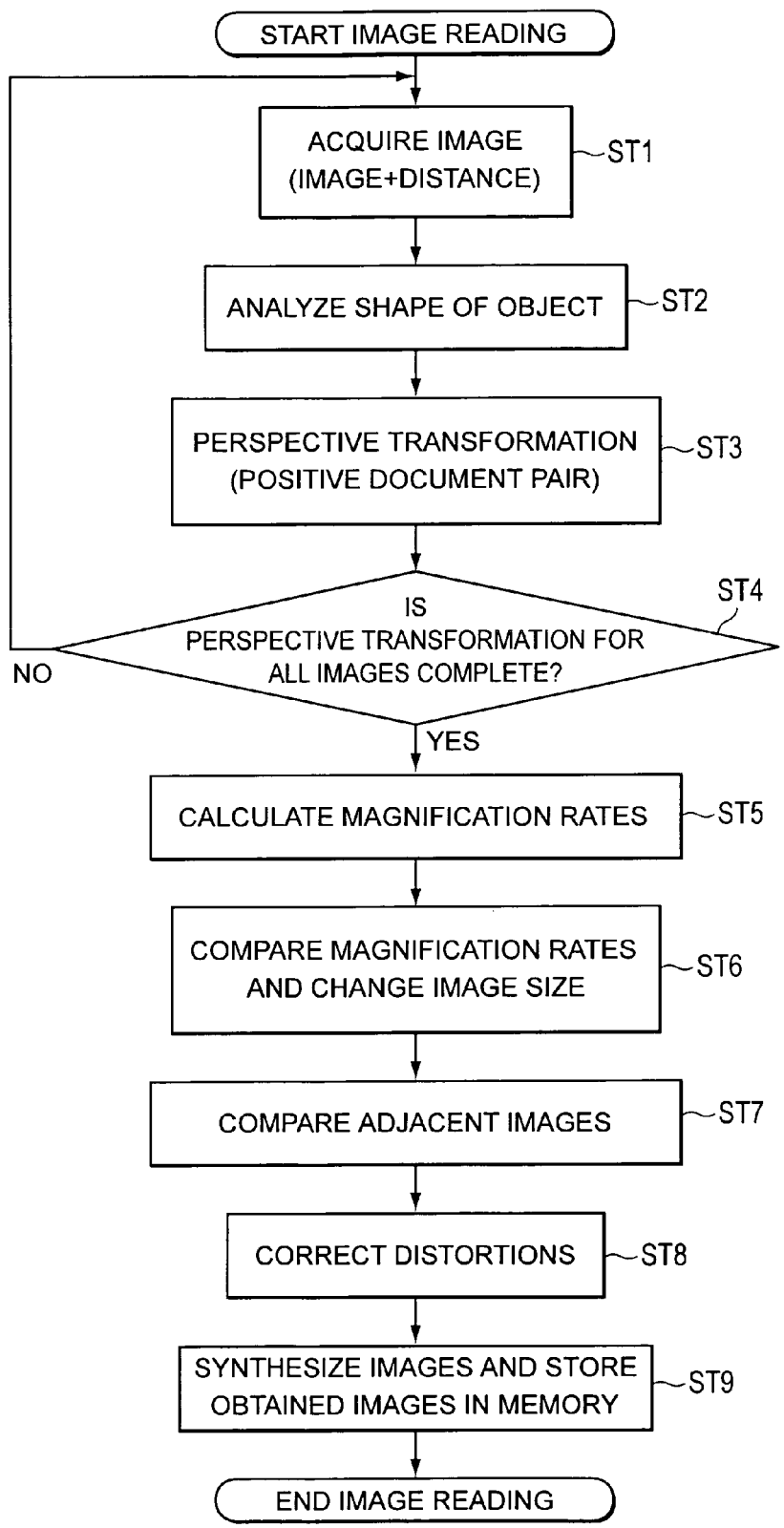
FIG. 4 is a flowchart showing the processing performed by the image reader according to the first embodiment.

FIG. 4 is a flowchart showing the processing performed by the image reading system. First, a user manipulates an input unit 42 of the computer 4 to enter information required for the reading of the document 2, such as the range for reading the document 2 and a desired resolution. The CPU of the computer 4 employs the information entered by the input unit 42 to determine the number of images to be acquired, and transmits via the RS232C cable 3B a control signal for the CCD camera 10 and the scanner 12 to the controller 13 of the image reader 1. Then, based on the control signal received from the computer 4, the controller 13 controls the zooming and focusing functions of the CCD camera 10 and the scanner 12 and initiates the reading of the document 2. At this time, as was previously described, the CCD camera 10 acquires the individual portions of the document 2 at the same optical magnification rate, so that adjacent images include overlapping areas, and transmits an image signal to the signal processor 14. The signal processor 14 then performs signal processing, such as an amplification process and various correction processes, for the image signal received from the CCD camera 10, and stores the resultant image signal in the image memory 15. At the same time as the CCD camera begins the acquisition of the image pickup, the distance measurement unit 11 obtains two-dimensional measurement information for the distance to the target portion of the document 2, which is acquired by the CCD camera 10, and transmits the distance information via the controller 13 to the synthesization controller 16 (ST1).

Subsequently, based on the distance information obtained by the distance measurement unit 11 (ST2), the synthesization controller 16 analyzes the shape of the targeted portion of the document 2 and performs a perspective transformation for the image that is read (ST3). Thereafter, the image acquisition (ST1), the shape analysis of the target portion of the document 2 (ST2) and the perspective transformation of the image (ST3) are sequentially performed. When the synthesization controller 16 has performed the perspective transformation for all the images, it employs the obtained distance information to calculate the magnification rate for each plane image (ST4). The synthesization controller 16 compares the image sizes (magnification rates) of the plane images, and changes to the maximum or to the minimum the sizes of the plane images (ST5) Following this, the synthesization controller 16 compares each plane image with its adjacent image (ST6), corrects for distortions (ST7), synthesizes the plane images to form a single complete image, and stores the obtained image in the image memory 15 (ST8). The image reading is thereafter completed, and via the image signal line 3A, the complete image stored in the image memory 15 is transmitted to the computer 4 by the controller 13 and is displayed by the display unit 41.

According to the first embodiment, since the image that is acquired is transformed into a plane image, even that portion of an image near the bound portion of an opened book, or on the curved face of a can, can be accurately read. Furthermore, since the image synthesization is performed after the image sizes of the plane images have been aligned, the time required for synthesization can be reduced.

In the first embodiment, image synthesization is performed by the main body 1A. However, images and the information required for synthesization may be transferred as needed via the interface 3 to the computer 4, which may then perform image synthesization.

Second Embodiment

Figure 5:
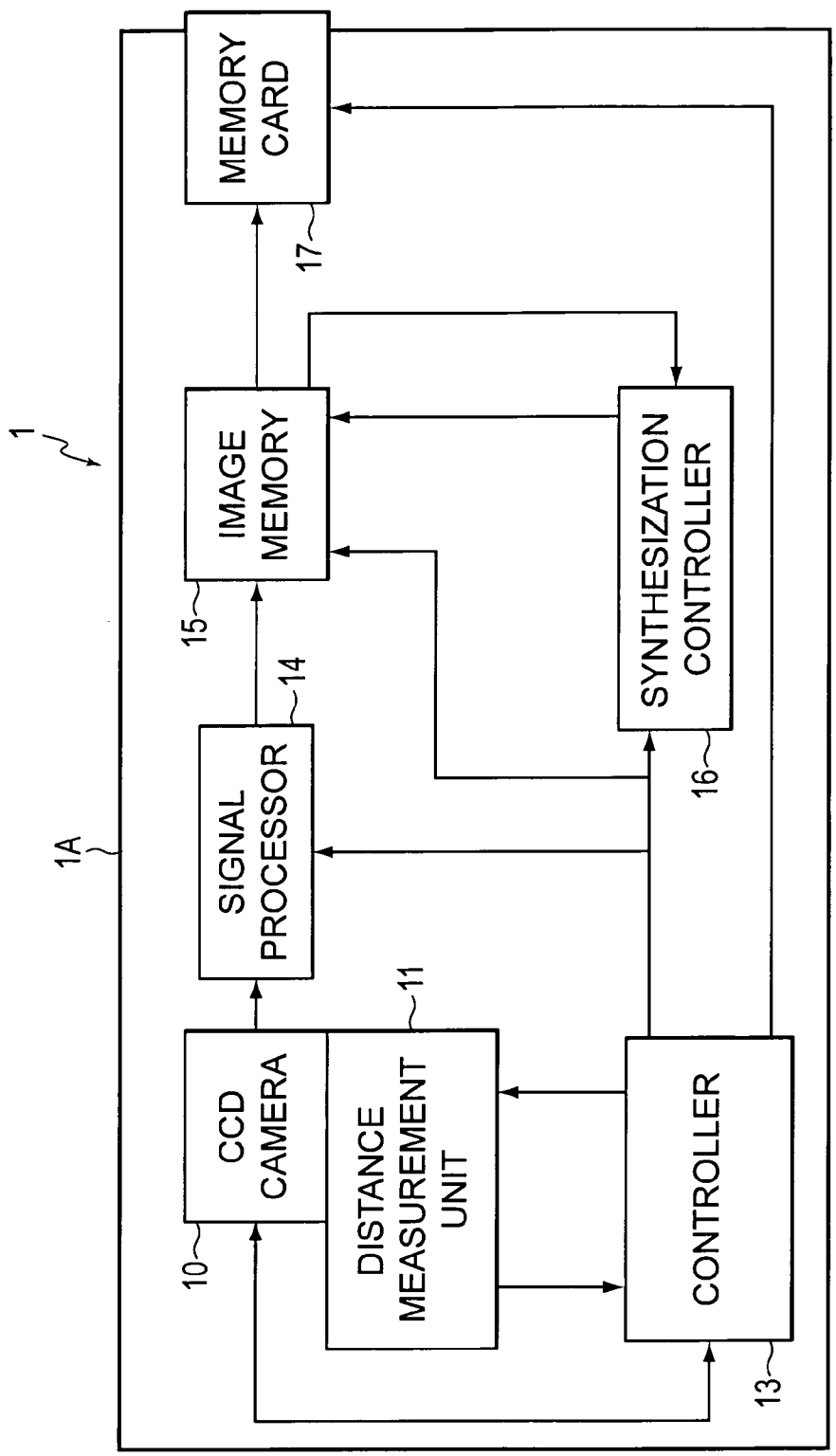
FIG. 5 is a block diagram showing the control system of an image reader according to a second embodiment of the present invention.

FIG. 5 is a diagram showing an image reader according to a second embodiment. In the second embodiment, the scanner 12 in the first embodiment is not employed, and a detachable memory card 17, such as a flash memory or a RAM card, is mounted in a main body 1A to provide a portable image reader.

The processing for the second embodiment will now be described. First, a user sets a resolution using a zooming function, and reads images using a hand-held image reader, so that the images have a specific overlapping area. At this time, together with the images, the distance information is also obtained. As in the first embodiment, multiple images are synthesized to form one complete image, and the complete image is read from the image memory 15 and written to the memory card 17. The user loads the memory card 17 into a driver 40a of a computer 4, where at the complete image is read, and thereafter the image is displayed on a display unit 41.

According to the second embodiment, since a scanner 12 is not included, and since the synthesization of plane images may be performed by the computer 4, instead of by an image reader 1, a compact and light image reader can be constructed that is easily carried and transported.

Third Embodiment

Figure 6:
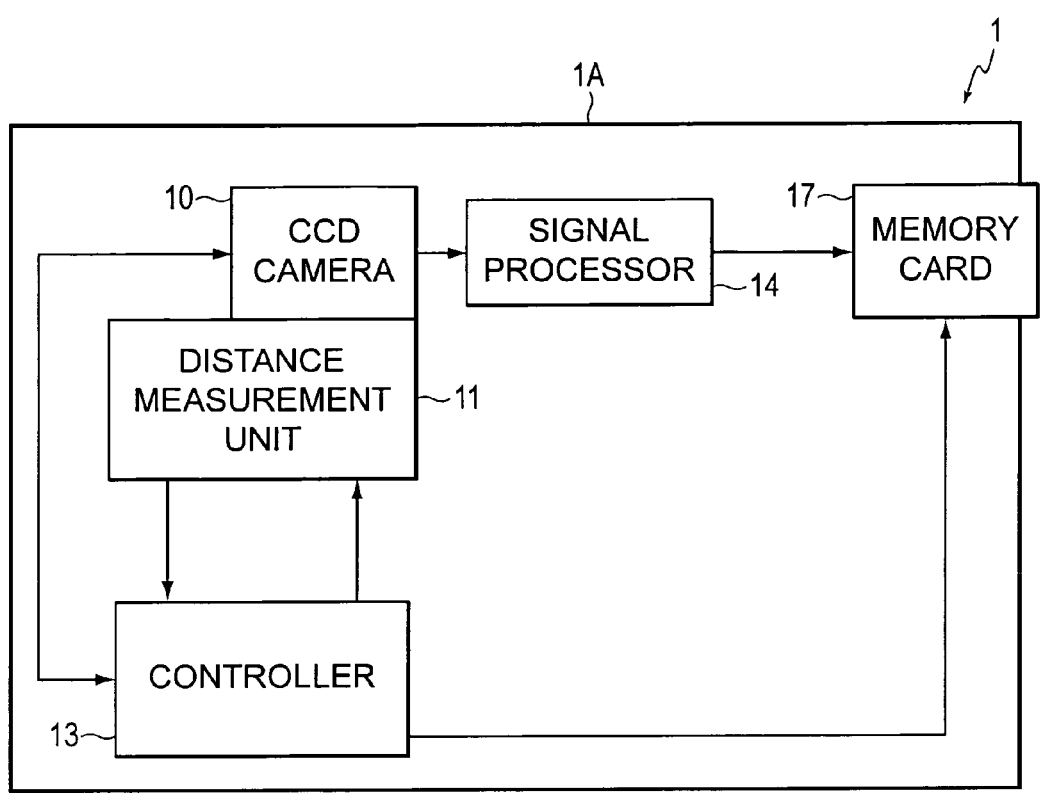
FIG. 6 is a block diagram showing the control system of an image reader according to a third embodiment of the present invention.

FIG. 6 is a diagram showing an image reader according to a third embodiment. In the third embodiment, all the images and distance information are written on a memory card 17, and a computer 4 thereafter synthesizes images. According to the this embodiment, a more compact and lighter image reader can be obtained that is more suitable for carrying.

Fourth Embodiment

Figure 7A:
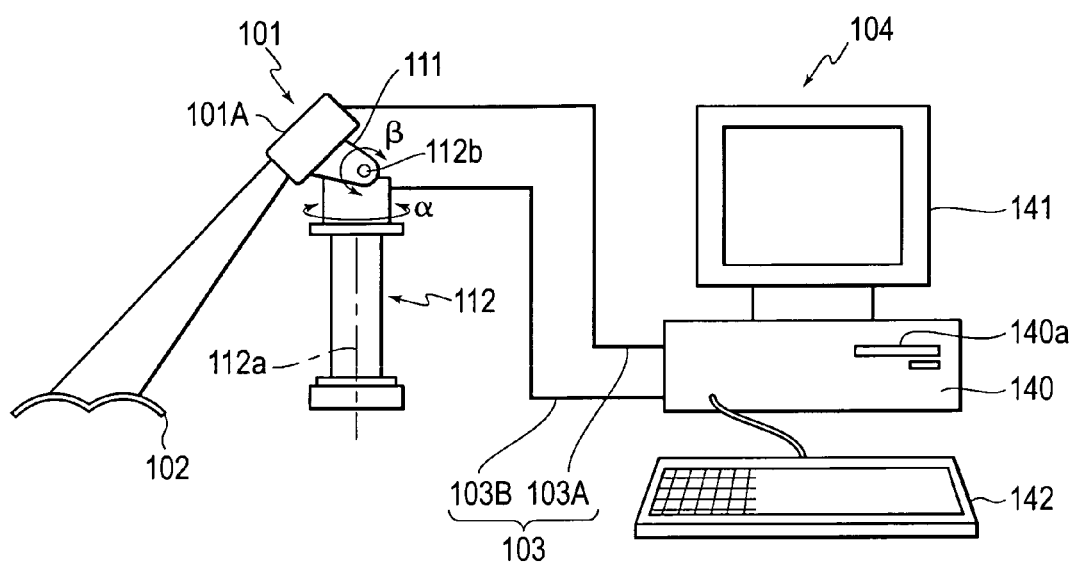
FIG. 7A is a diagram showing an image reading system to which an image reader according to a fourth embodiment of the present invention is applied.

FIG. 7A is a diagram showing an image reading system that employs an image reader according to a fourth embodiment of the present invention. The image reading system comprises: an image reader 101, for reading a document 102, an object; and a computer 104, which is connected to the image reader 101 by an interface 103, such as an image signal line 103A and an RS232C cable 103B. The image reader 101 includes a main body 101A in which a digital CCD camera, which will be described later, is mounted, and a scanning unit 112, for pivoting the main body 101A along an axis 112a and at a shaft 112b in a direction α or β, as is indicated by an arrow.

The computer 104 includes a computer main body 140 in which a CPU and a memory are mounted; a display unit 141, such as a CRT; and an input unit 142, such as a keyboard or a mouse. The computer 4 processes an image that is read, or controls the zooming and the focusing of the digital CCD camera and the positioning that is required to read an image. The computer main body 140 also includes a drive 140a for reading data from a memory card, such as a floppy disk, that has been loaded.

Figure 7B:
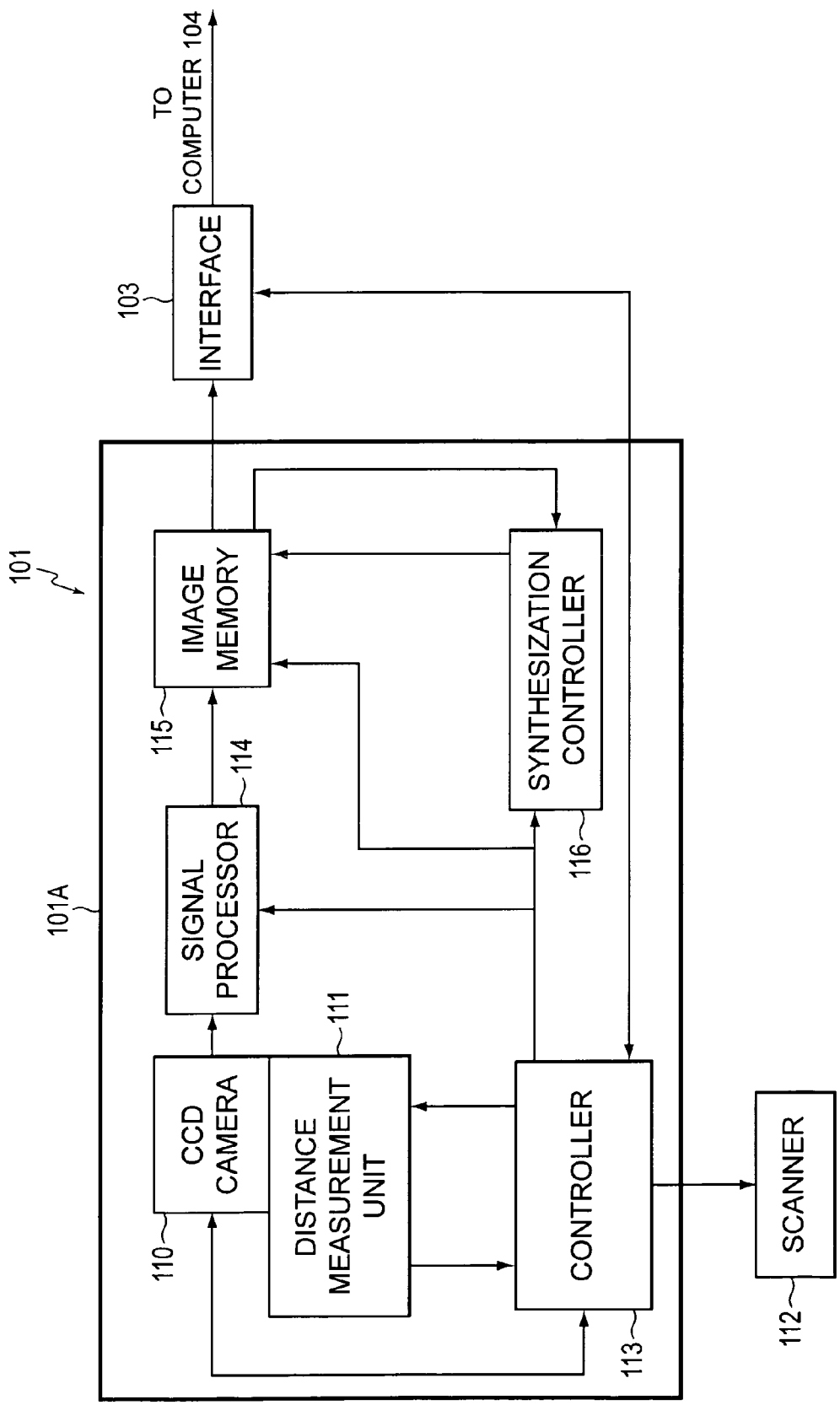
FIG. 7B is a block diagram illustrating the control system of the image reader according to the fourth embodiment.

FIG. 7B is a diagram showing the control system of the image reader 101. The main body 101A of the image reader 101 comprises: a digital CCD camera, having a zooming function and a focusing function; a distance measurement unit 111, for obtaining two-dimensional distance information (distances to n×m measurement points) for the targeted portions of a document 102 that is acquired by the CCD camera 110; a scanner 113, for changing the viewing directions of the CCD camera 110 and the distance measurement unit 111; a controller 113, for controlling the CCD camera 110, the distance measurement unit 111 and the scanner 112; a signal processor 114, for performing signal processing, such as amplification or correction, for a pickup signal received from the CCD camera 110; an image memory 115, for storing images; and a synthesis controller 116 for synthesizing images stored in the image memory 115.

The distance measurement unit 111 employs the pattern projection method or the phase distribution measurement method to obtain two-dimensional information for the distance to the document 102. According to an example pattern projection method, whereby a laser beam is employed to generate, based on pattern code, a light pattern that consists of multiple regions the intensity of which is modulated to obtain triple level or higher data, the light pattern produces an image of the document 102 and the light reflected from the document 102 is acquired to prepare an image pattern, whereafter, the pattern code and the pattern image are employed to obtain information for measuring the distance to the document 102. Using this method, since the laser beam used as a light source has a linearity that little affects the depth of focus, the edges between the regions are not blurred, and for the depth, the measurable range is expanded. Further, since an image of the document 102 is projected by the pattern light at the modulated intensity, two-dimensional information for measuring the distance to the document 102 can be obtained using a single image pickup. In addition, there is an example phase distribution measurement method whereby light, whose intensity is modulated at a predetermined frequency, is emitted and strikes the document 102, and whereby a composite light, consisting of light reflected by the document 102 and the above emitted light, is received by a plane sensor that is constituted by multiple, two-dimensionally arranged pixels, and information for the distance to the document 102 is obtained based on the detection signal. According to this method, the two-dimensional information for the distance to the document 102 can be obtained by a single one measurement.

Based on an image signal fetched into the image memory 115 and the information obtained by the distance measurement unit 111 for the distance between the document and the CCD camera 110, the synthesization controller 116 performs perspective transformation, calculation of a magnification rate, the alteration of image size, and a process for synthesizing image segments that are acquired by superimposing a specific area of the document 102 to a preview image obtained for the overall document 102.

FIG. 8 is a diagram for the perspective transformation and calculation of a magnification rate that are performed by the synthesization controller 116. In FIG. 8, black dots represent the points used for the measurement of distances. The synthesization controller 116 employs the distance information ($L_1$, $L_2$, $L_3$ and $L_4$) to estimate similar curves, and to identify the shape of an object. Then, the synthesization controller 116 performs a perspective transformation so that a preview image 119 or a image segment 121 stands, upright relative to a pickup device 110a of the CCD camera 110, and constitutes a plane. In FIG. 8, the distances $L_1$, $L_2$, $L_3$ and $L_4$ from the pickup device 110 to the individual points of the image 119 or 121 are transformed into distances $L'_1$, $L'_2$, $L'_3$ and $L'_4$, and the preview image 119 or the image segment 121 obtained by the perspective transformation is called a "plane preview image" 120 or a "plane image" 122. Furthermore, the synthesization controller 116 calculates multiple distances on the plane preview image 120 or the plane image 122, e.g., distances between points A' and B' and between points A' and C', and performs a "magnification rate calculation" to obtain a magnification rate relative to a predetermined reference size.

Figure 9:
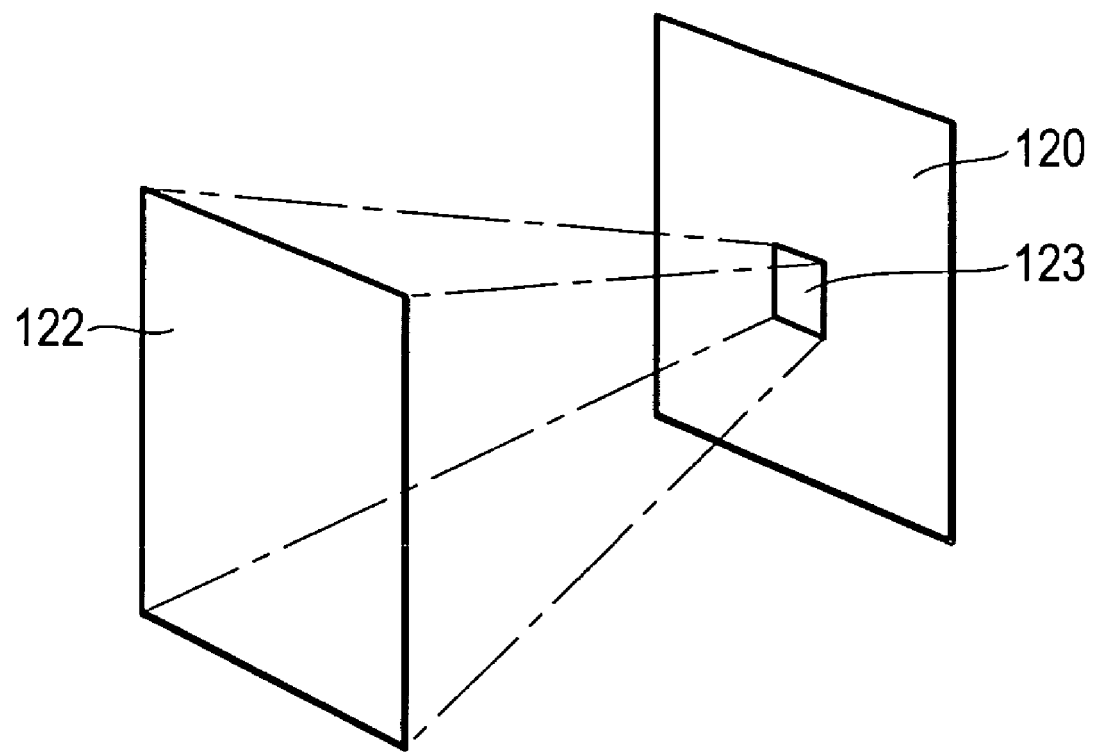
FIG. 9 is a diagram showing the synthesization processing performed by the synthesization controller of the image reader according to the fourth embodiment.
Figure 10A:
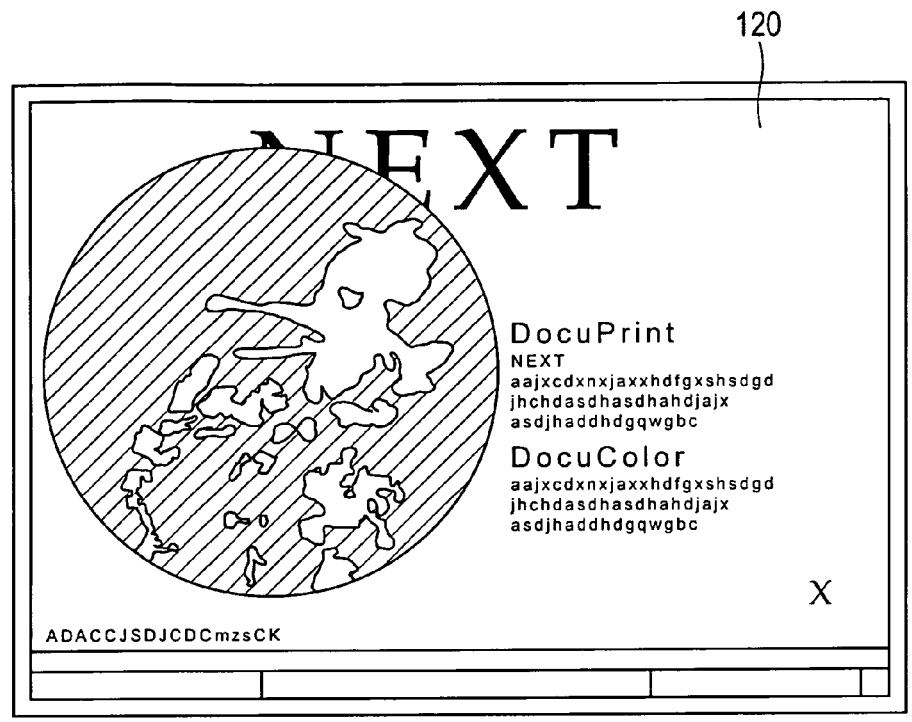
FIG. 10A is a diagram showing a complete image for the synthesization process performed by the synthesization controller of an image reader according to a fourth embodiment.
Figure 10B:
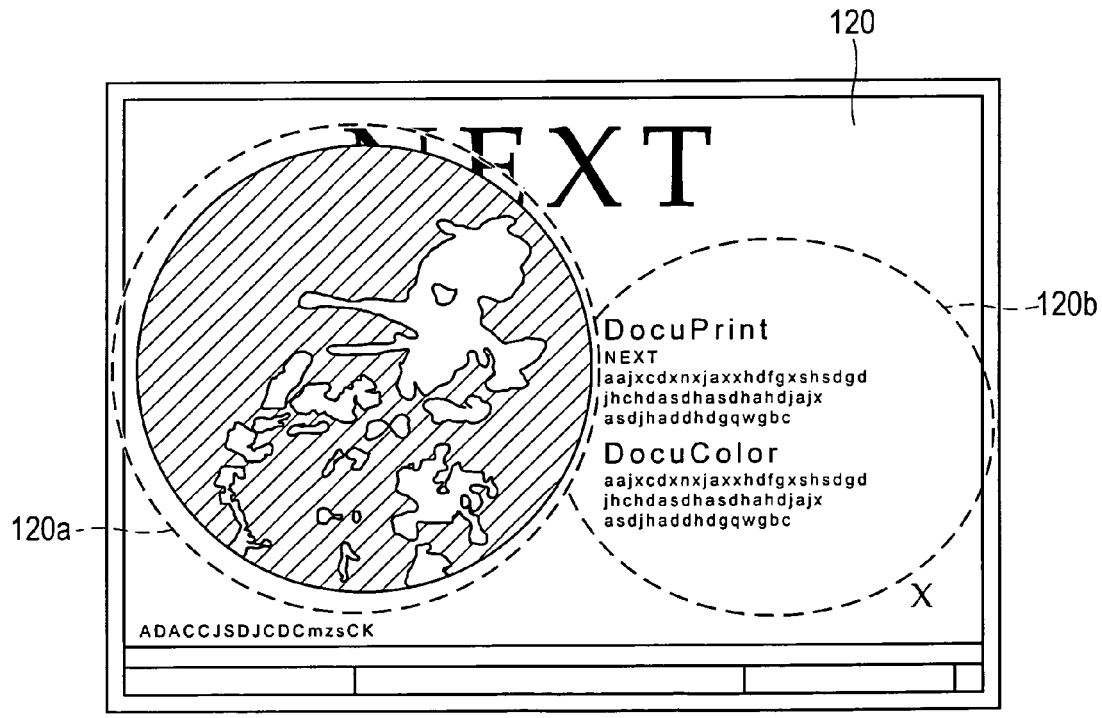
FIG. 10B is a diagram showing the processing performed to extract a feature for the synthesization process.

FIG. 9 is a diagram showing the synthesization process performed by the synthesization controller 116. The synthesization controller 16 reduces the size of the plane image segment 122 to na/np (na: the optical magnification rate when the complete image was acquired; and np: the optical magnification rate when the image segment was acquired) to obtain a plane image segment 123. Then, the synthesization controller 116 determines the location whereat the density pattern of the peripheral area of the plane image segment 23 most closely resembles the density pattern of the plane preview image 120, which is stored in the image memory 115, and that corresponds to the complete document 102. The synthesization controller 16 then fits the image segment 123 into that location, and completes the "synthesization process". It should be noted that, during this synthesization process, a corresponding area in the plane preview image 120 is deleted, and the plane image segment 123 is fitted into that area.

FIGS. 10 to 13 are diagrams and a flowchart showing the processing performed by the image reading system. First, a user manipulates an input unit 142 of the computer 104 to enter information required for the reading of the document 102, such as the range for the reading of the document 102 and a desired resolution. Based on the information entered by the input unit 142, the CPU of the computer 104 transmits, via the RS232C cable 103B, a control signal for the CCD camera 110 and the scanner 112 to the controller 113 of the image reader 101. Based on the control signal received from the computer 104, the controller 113 controls the zooming and focusing functions of the CCD camera 110 and the scanner 112 and initiates the reading of the document 102. The CCD camera 110 acquires a complete image of the document 102, and transmits to the signal processor 114 a pickup signal for the preview image 119. The signal processor 114 performs signal processing, such as an amplification process and various correction processes, for the image signal received from the CCD camera 110, and stores the resultant image signal in the image memory 115. At the same time as the CCD camera begins to acquire the image, the distance measurement unit 111 obtains a two-dimensional measurement for the distance to the targeted portion of the document 102 that is acquired by the CCD camera 110, and transmits the distance information, via the controller 113, to the synthesization controller 116 (ST101). The synthesization controller 116 analyzes the shape of the targeted portion of the document 102, based on the distance information obtained by the distance measurement unit 111 (ST102), and performs a perspective transformation for the preview image 119 that is read (ST103). The magnification rate is then calculated for the obtained plane preview image 120, and is stored in the image memory 115 (ST104). FIG. 10A is a diagram showing the plane preview image 120 obtained by the perspective transformation. Following this, the synthesization controller 116 extracts a feature of the plane preview image 120 (ST105). During this process, as is shown in FIG. 10B, an image area 120a or a text area 120b is identified.

The resolution (optical magnification rate) is changed by controlling the zooming of the CCD camera 110 (ST106), and an image is acquired of a specific portion (text area 120b) of the document 102 that requires a high resolution. That is, while watching a monitor (not shown), the user manipulates the input unit 142 and enters the range for reading the specific portion of the document 102. The CPU of the computer 104 then employs the information provided by the input unit 142 to transmit the control signal for the CCD camera 110 and the scanner 112 to the controller 113 of the image reader 111 via the RS232C cable 103B. Based on the control signal received from the computer 104, the controller 113 controls the zooming and focusing functions of the CCD camera 110 and the scanner 112 while the specific portion of the document 102 is read. The CCD camera 10 acquires, at a high resolution, the image of the specific portion of the document 102, and transmits the pickup signal for the obtained image segment 121 to the signal processor 114 (ST107). The signal processor 114 then performs signal processing, such as an amplification process and various correction processes, for the pickup signal received from the CCD camera 110, and stores the obtained image signal in the image memory 115. At the same time as the CCD camera 110 begins to acquire the image, the distance measurement unit 111 obtains a two-dimensional measurement for the distance to the specific portion of the document 102 that is acquired by the CCD camera 110, and transmits the distance information, via the controller 113, to the synthesization controller 116. Based on the distance information obtained by the distance measurement unit 111 (ST108), the synthesization controller 116 analyzes the shape of the specific portion of the document 102 and performs a perspective transformation for the image 121 that is read (ST109). Thereafter, the magnification rate is calculated for the plane image segment 122 obtained by the perspective transformation (ST110).

Figure 11A:
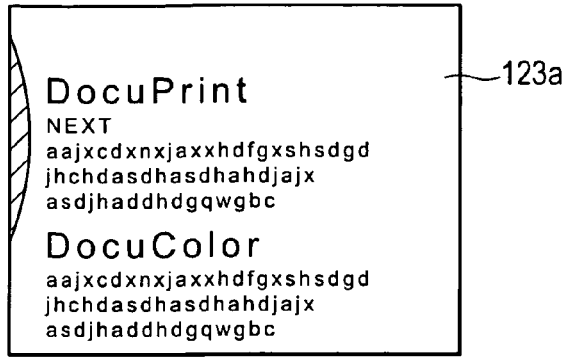
FIG. 11A is a diagram showing a text area for the synthesization process.
Figure 11B:
FIG. 11B is a diagram showing another text.
Figure 11C:
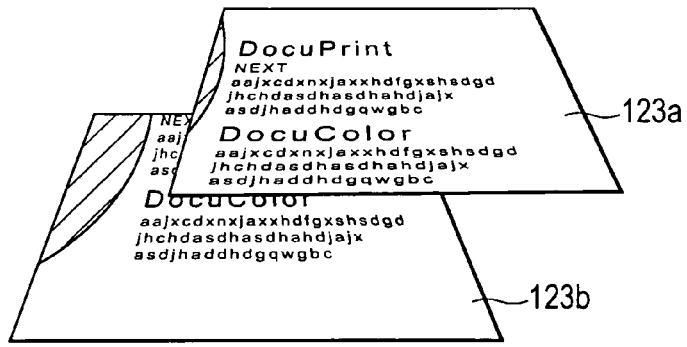
FIG. 11C is a diagram showing the synthesization of image segments.
Figure 12A:
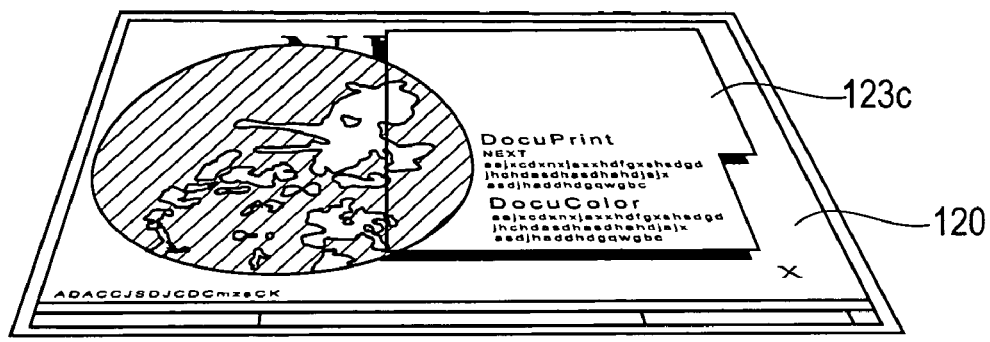
FIG. 12A is a diagram showing the superimposition process performed by the synthesization controller of the image reader according to the fourth embodiment.
Figure 12B:
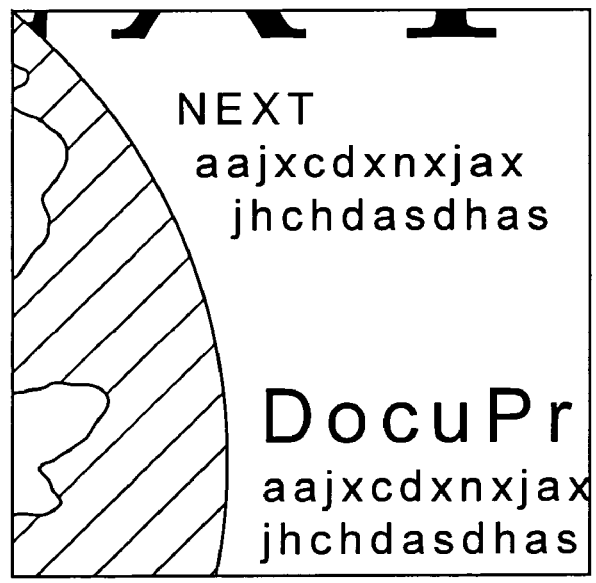
FIG. 12B is an enlarged diagram showing the synthesized portion.
Figure 13:
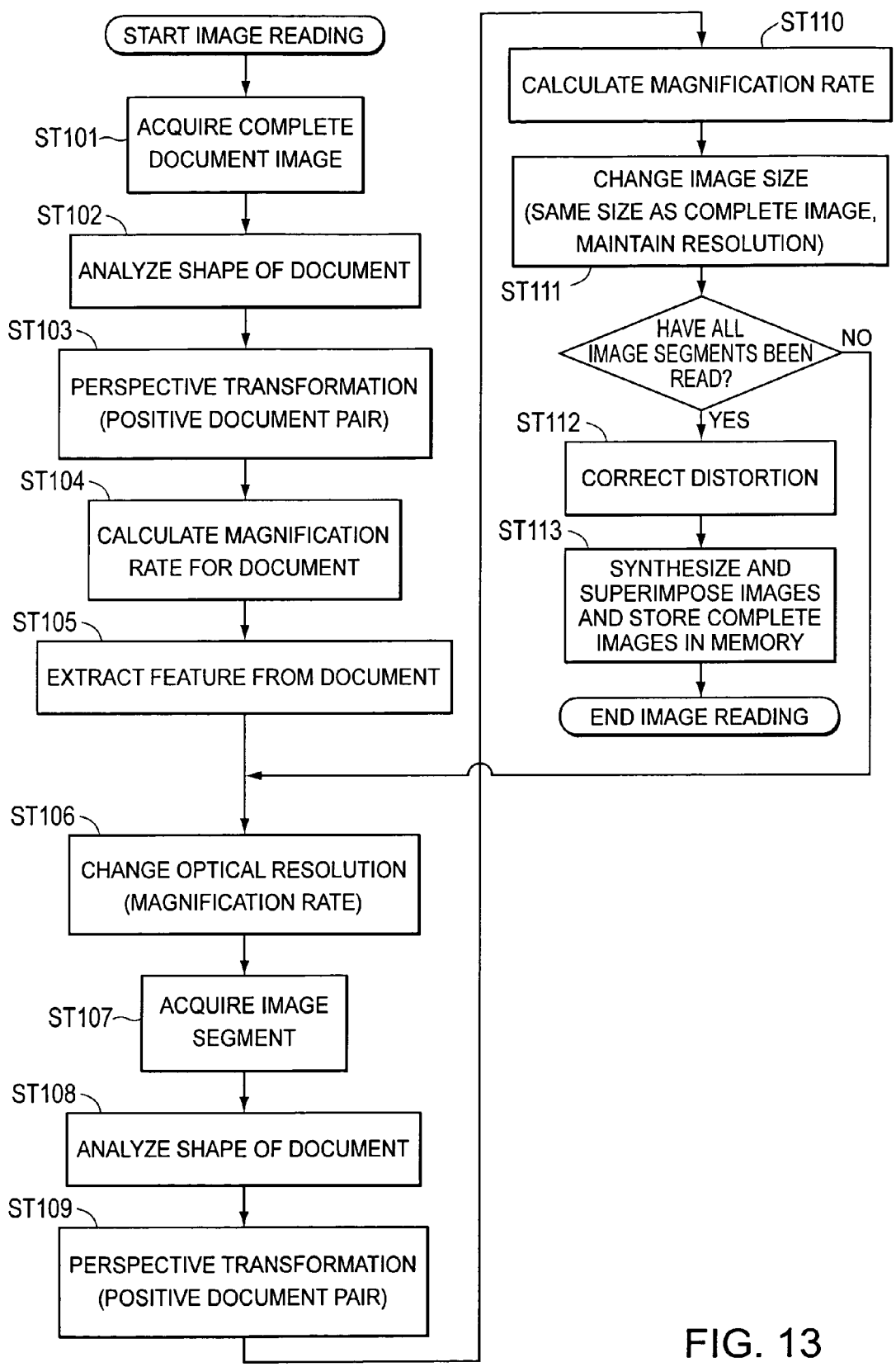
FIG. 13 is a flowchart showing the processing performed by the image reader according to the fourth embodiment.

Following this, the synthesization controller 116 reduces the size of the plane image segment 122 obtained by a perspective transformation performed at the same optical magnification rate as that of the plane preview image 120, i.e., at na/np, to obtain the plane image segment 123 (ST111), and steps ST106 to ST111 are repeated until the reading of the image segment 121 is completed. FIGS. 11A and 11B are diagrams showing two adjacent plane image segments 123a and 123b. When the reading of all the image segments has been completed, distortion correction is performed (ST112). As is shown in FIG. 1C, the plane image segments 123a and 123b are synthesized, and as is shown in FIG. 12A, the obtained plane image segment 123c and the plane preview image 120 are superimposed to form a single complete image, which thereafter is stored in the image memory 115 (ST113). With this, the image reading is completed, and the complete image stored in the image memory 115 is transmitted to the computer 104, across the image signal line 113A, by the controller 113, and is displayed on the display unit 141. FIG. 12B is an enlarged diagram showing the portion obtained by synthesization. As is shown in FIG. 12B, the text area 120b is read at a high resolution and clear characters are presented.

According to the above fourth embodiment, only a required portion of the document is read at a high resolution to obtain the image segment and at a low resolution to obtain the preview image, and the image segment and the previous image are superimposed. Thus, the number of required image segments can be reduced and the time needed for synthesization can be shortened.

Further, based on the distance information, the image that is picked up is transformed into the plane preview image and the plane image segment. Thus, even an image of an area near the bound portion of an opened book or an image of a portion of the curved face of a can be accurately read.

Fifth Embodiment

Figure 14:
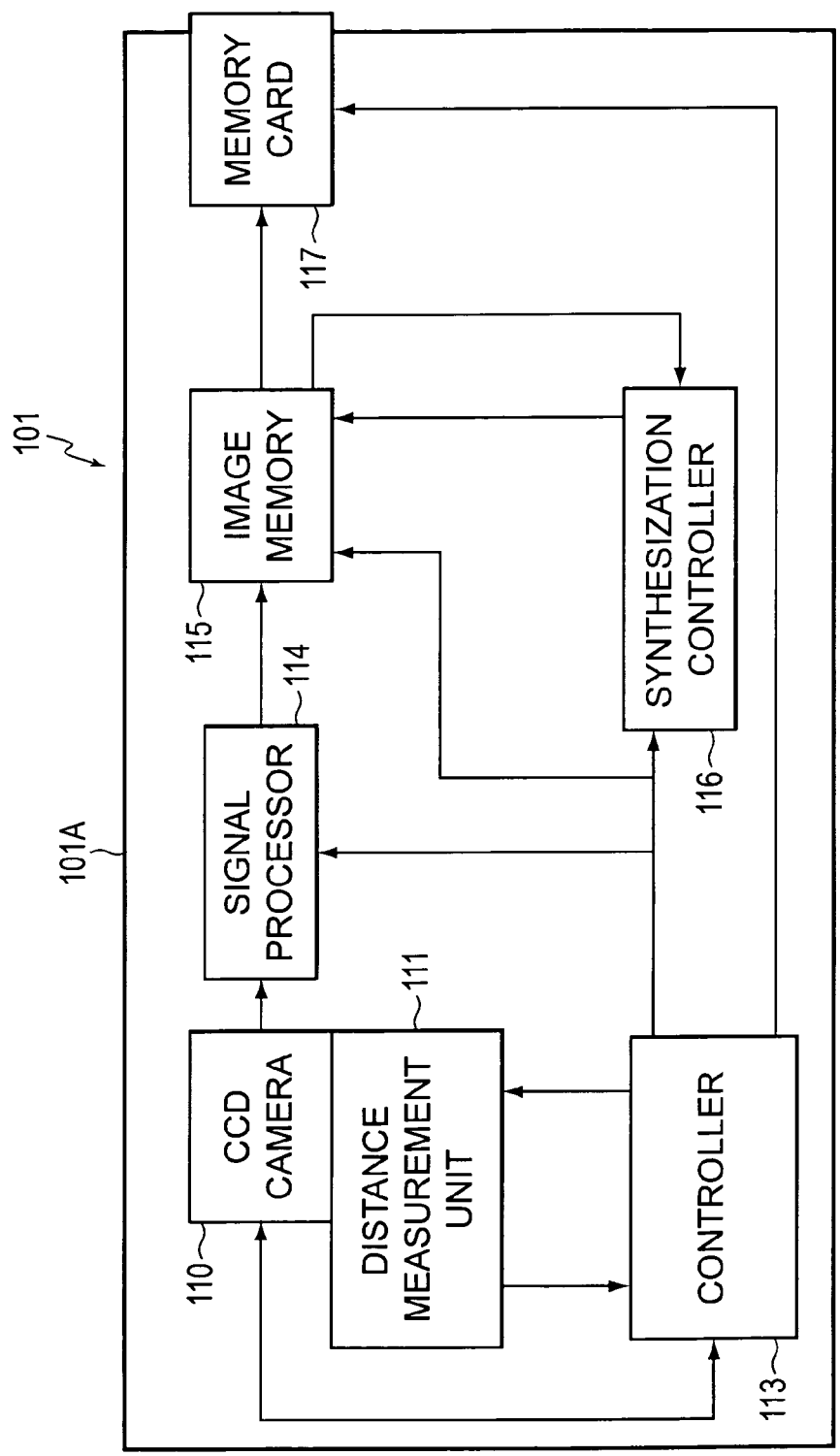
FIG. 14 is a block diagram showing the control system of an image reader according to a fifth embodiment of the present invention.

FIG. 14 is a diagram showing an image reader according to a fifth embodiment. In the fifth embodiment, the scanner 112 in the first embodiment is not employed, and a detachable memory card 117, such as a flash memory or a RAM card, is mounted in a main body 101A to provide a portable image reader.

The processing for the fifth embodiment will now be described. First, a user sets a resolution using a zooming function, and scans the overall document 102 and a specific area of the document 2 using a hand-held image reader. At this time, together with the images, the distance information is also obtained. As in the fourth embodiment, the overall image and the image of the specific area are synthesized to form one complete image, and the complete image is read from the image memory 115 and written to the memory card 117. The user loads the memory card 117 into a driver 140a of a computer 104, whereat the complete image is read, and thereafter the image is displayed on a display unit 141.

According to the fifth embodiment, since the scanner 112 is not included, a compact and light image reader that is suitable for transportation by hand can be constructed, and the synthesization of plane images can be performed by the computer 104, instead of the image reader 111. In the fourth embodiment, since a high resolution image of a specific area can be acquired by changing the optical magnification rate, and in the fifth embodiment, since the image reader is portable, a user can hold the image reader while approaching a specific portion of the document 102, and an image of a specific portion can be acquired at a shorter distance.

Sixth Embodiment

Figure 15:
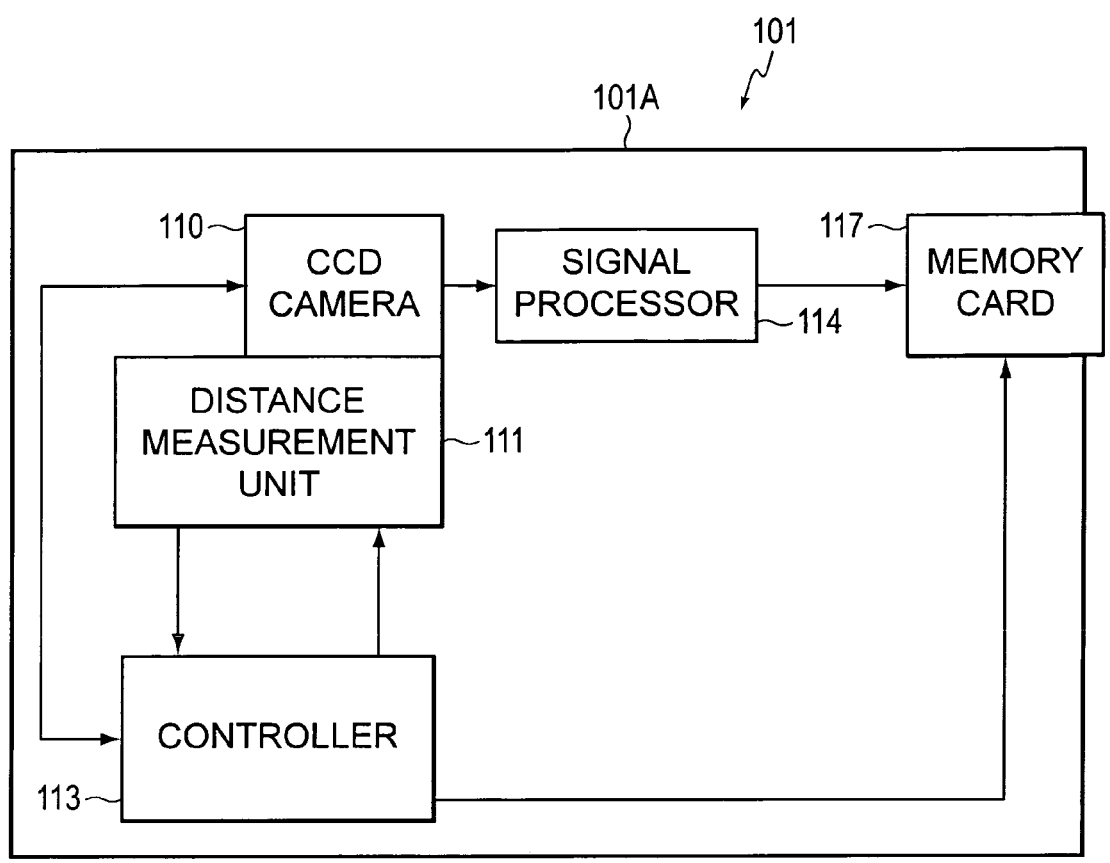
FIG. 15 is a block diagram showing the control system of an image reader according to a sixth embodiment of the present invention.

FIG. 15 is a diagram showing an image reader according to a sixth embodiment. In the sixth embodiment, all the images and distance information are written on a memory card 117, and a computer 104 thereafter synthesizes images. According to this embodiment, a more compact and lighter image reader can be constructed that is more suitable for transporting by hand.

A text area may be acquired at a resolution that is consonant with the font size. Further, three or more resolutions may be employed, depending on the object.

The magnification rate employed for an image may be calculated based on the zooming function of a CCD camera.

Furthermore, to synthesize a preview image at a low resolution and an image segment at a high resolution, the image segments may be hierarchically positioned on the preview image, and an image segment may be hieratically positioned on another image segment. Therefore, when an image segment is to be moved and positioned as a moving picture on a preview image, image processing can be facilitated.

As is described above, according to the image reader of this invention, perspective transformation is performed for multiple images that are acquired to prepare plane images, and the sizes of the plane images are altered so that they correspond. Thus, for the synthesization of plane images, even when an object is distorted, reading of an image of the object can be performed accurately and quickly.

Further, since multiple images are acquired using a handheld image reader, and the distances to multiple target portions are calculated, a compact and light image reader can be provided.

What is claimed is:

1. An image reader comprising:
   an image pickup unit for imaging an object at a predetermined resolution to obtain a first image, the image pickup unit for imaging a specific portion of the object at a higher resolution than the predetermined resolution to obtain a second image; and
   a processing unit for reducing the size of the second image to obtain a reduced second image and superimposing the reduced second image on the first image.

2. An image reader comprising:
   an image pickup unit for imaging a plurality of multiple adjacent target portions at different resolutions from each other to obtain a plurality of multiple images each having the different resolutions; and
   a processing unit for resizing the plurality of images in accordance with the different resolutions to obtain a plurality of resized images, the processing unit for synthesizing the plurality of resized images to obtain a single image.

3. A method of reading an image, the method comprising:
   imaging an object at a predetermined resolution to obtain a first image;

imaging a specific portion of the object at a higher resolution than the predetermined resolution to obtain a second image;

reducing the size of the second image to obtain a reduced second image; and superimposing the reduced second image on the first image.

4. A method of reading an image, the method comprising:

imaging a plurality of multiple adjacent target portions at different resolutions from each other to obtain a plurality of multiple images each having the different resolutions;

resizing the plurality of images in accordance with the different resolutions to obtain a plurality of resized images; and synthesizing the plurality of resized images to obtain a single image.

5. The image reader according to claim 1, wherein the specific portion of the object is determined based on the first image.

6. The method according to claim 3, further comprising determining the specific portion of the object based on the first image.

* * * * *